United States Patent [19]

Kennedy

[11] Patent Number: 5,280,875
[45] Date of Patent: Jan. 25, 1994

[54] RESILIENT SEATED MUD VALVE

[75] Inventor: Paul G. Kennedy, Horseheads, N.Y.

[73] Assignee: Penn Troy Machine Co., Inc., Troy, Pa.

[21] Appl. No.: 958,275

[22] Filed: Oct. 8, 1992

[51] Int. Cl.$^5$ ............................................. F16K 51/00
[52] U.S. Cl. ..................................... 251/144; 251/333
[58] Field of Search ......................... 251/144, 333, 356

[56] References Cited

U.S. PATENT DOCUMENTS

| | | | |
|---|---|---|---|
| 2,969,218 | 1/1961 | Shaw | 251/333 X |
| 3,467,357 | 9/1969 | Schomer et al. | 251/333 X |
| 4,240,607 | 12/1980 | Carlson | 251/144 |
| 4,313,591 | 2/1982 | Wempe et al. | 251/144 |
| 4,368,755 | 1/1983 | King | 251/333 X |
| 4,766,927 | 8/1988 | Conatser | 251/333 X |
| 5,076,539 | 12/1991 | Holt | 251/144 |

OTHER PUBLICATIONS

Wernman Industries, Inc., "Mud Valves-Models MV-11 & MV-12" 3 pages.
Troy Valve, "Mud Valves (or Plug Drain)", 1 page.
Clow Corporation, "Pipe Economy" pp. 18-21, 54-55, 64-65 and cover.

Primary Examiner—Martin P. Schwadron
Assistant Examiner—Kevin L. Lee
Attorney, Agent, or Firm—Michael F. Brown; Ralph R. Barnard; Christopher A. Michaels

[57] ABSTRACT

A mud valve having a plug seat which is made of a resilient material, and which forms the seal at an angle of approximately 28° from the vertical. The valve seat is formed with a matching 28° inclination to mate with the resilient seat.

7 Claims, 2 Drawing Sheets

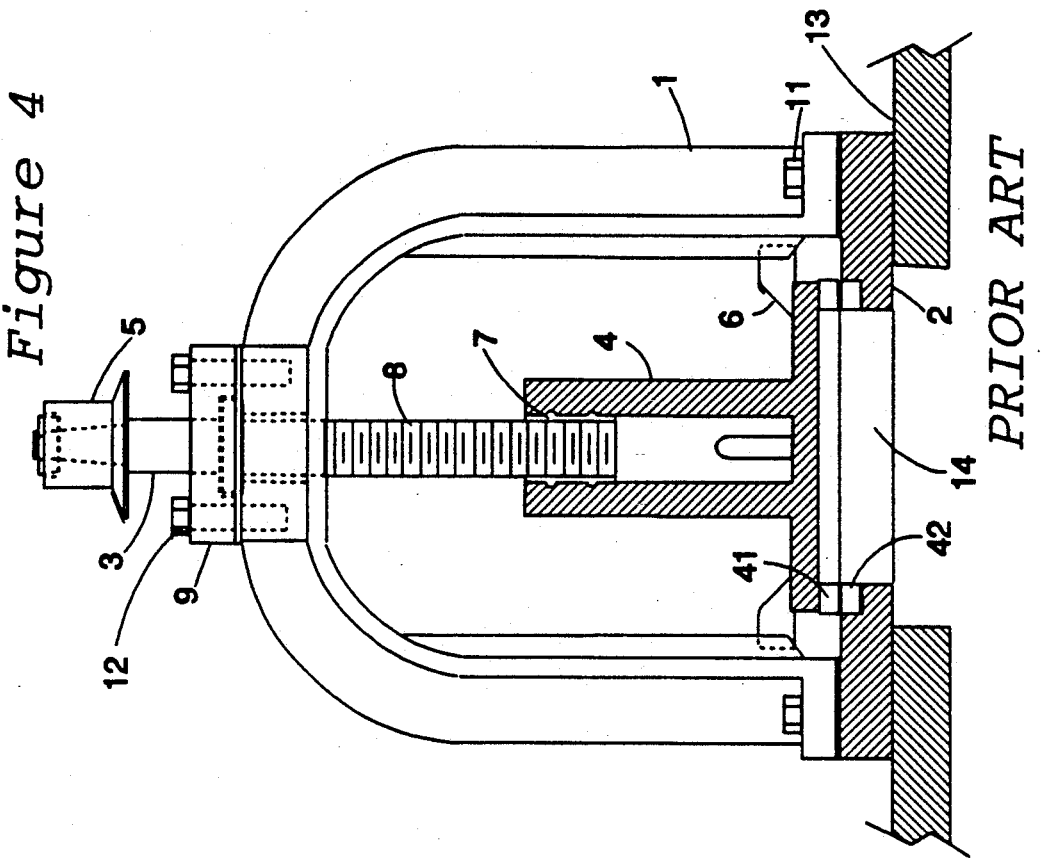
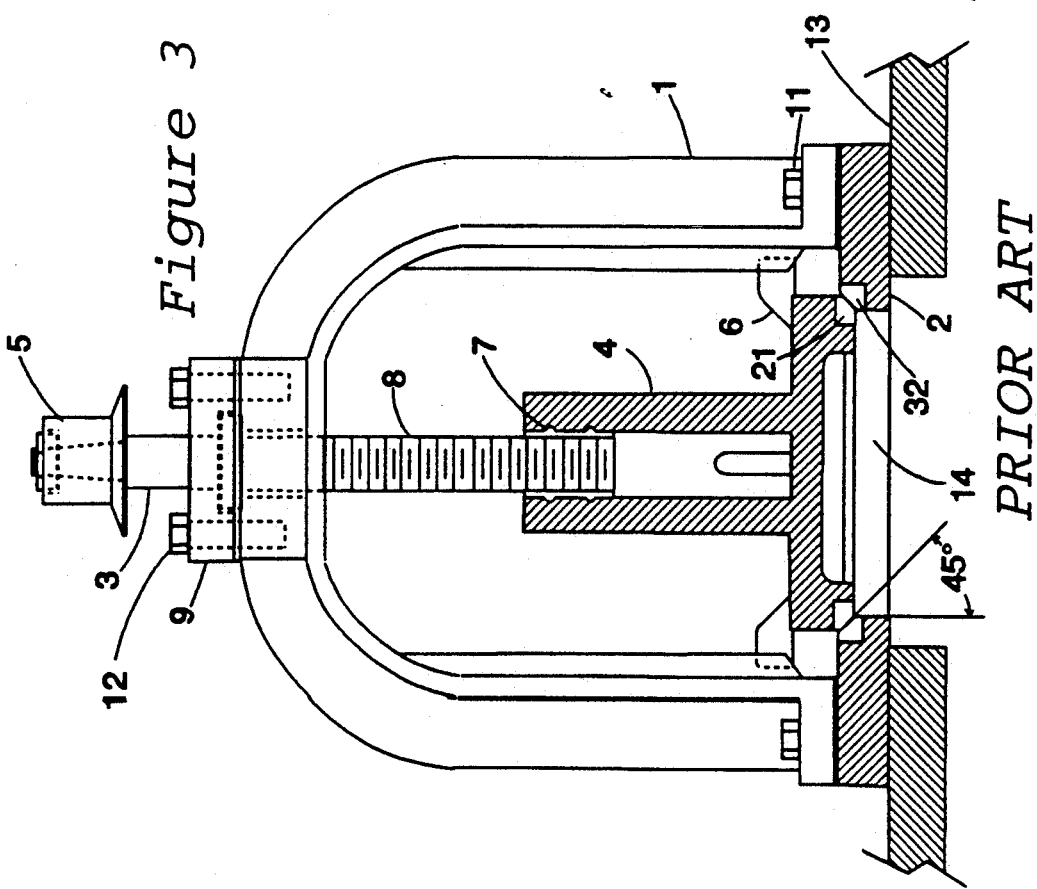

RESILIENT SEATED MUD VALVE

FIELD OF THE INVENTION

The invention pertains to the field of valves. More particularly, the invention pertains to the field of valves designed to fit into the bottom of a tank of liquid, commonly known to the art as "Mud Valves".

BACKGROUND OF THE INVENTION

Mud Valves are a kind of valve which are used primarily as drain valves for large containers of liquid, such as the various tanks used in sewage treatment plants or the like. They are mounted flat upon one surface of a tank for holding fluids, typically inside the tank on the bottom, and are usually used to prevent or enable a liquid in the tank from draining into pipes.

Mud valves have long been known to the art. They have the advantage of being inexpensive and simple to operate, and, since they mount within the tank, can shut off the tank and allow removal and maintenance of the pipes leading to the tank without loss of liquid. Despite these advantages, mud valves have been declining in popularity in recent years.

In all figures, identical reference numbers refer to identical features.

The prior art mud valve, as illustrated in FIG. 3, has a circular frame 2 mounting flat upon the bottom of a tank 13 over an opening in the bottom. The center of the frame 2 is open, forming the valve opening 14, through which liquids may pass. The frame 2 has a valve seat 32 surrounding the valve opening 14 in the middle of the frame 2. A horseshoe-shaped yoke 1 is attached to the frame, typically by means of bolts 11, and extends above the frame, and perpendicular to it, up into the tank. A stem 3 extends through the yoke 6 above the center of the valve opening 14. The stem is free to rotate around its long axis. The bottom end of the stem extends into the center of horizontal circular plug 4. The plug 4 has a portion around its bottom edge which acts as a plug seat 31, matching the valve seat 32 on the frame 2. The plug 4 usually has flanges 6 which ride along the sides of the yoke 1 to prevent the plug 4 from turning relative to the yoke. The top end of the stem 3 is adapted to mate with a valve handle, perhaps by being attached to a hex-shaped cap 5 which will fit a wrench or the like.

In the "non-rising-stem" type mud valves shown in all of the figures, the portion 10 of the stem 3 which passes through the yoke 1 is not threaded, but the stem is threaded along its lower portion 10 where it mates with an extended part 7 of the plug which is threaded to match the stem. The stem is held into the yoke by a cap 9 bolted to the yoke 1. As the stem is turned, it remains in position relative to the yoke, but the plug is drawn vertically up or down by the threads on the stem, carrying the plug seat toward or away from the valve seat, and thus opening or closing the valve.

In an alternative "rising stem" design (not shown), the portion of the stem which passes through the yoke is threaded, but the plug itself is not threaded, so that the stem may turn freely within the plug (while remaining affixed to the plug for vertical movement). As the stem rises and falls, the plug is drawn up or down. It will be understood by one skilled in the art that this variation does not affect the operation of the seal, which is the focus of this invention.

The plug seat-to-valve seat seal, as shown in FIG. 4, has traditionally been nothing more than a flat seat area 42 upon which the a portion of the plug 41 is pressed. An improvement in this (FIG. 3) has the plug formed with a seat area 31 which tapers at 45°, mating with a recessed seat area 32 in the frame which also is tapered at 45°. In all prior art designs of which the inventor is aware, both the valve seat and plug seat areas are made of a nonresilient material such as bronze or the like, for long wear.

This has caused mud valves to develop a reputation for leakage, as it is difficult to impossible to attain a bubble-tight seal with non-resilient seats and current valve designs.

With the increasing strictness of environmental controls, it has become more important to be able to shut off valves without leakage. Designers have been forced by this to abandon the simple, inexpensive mud valve in favor of more expensive and complicated in-line valves such as butterfly, plug or gate valves. These valves are capable of bubble-tight seals, but they must mount in piping, which means that the tank itself cannot be sealed off, as it could with an in-tank mud valve.

It is thus an object of this invention to provide a mud valve which is capable of a bubble-tight seal.

The prior art mud valves, whether flat sealed or 45 degree sealed, are also strictly unidirectional—that is, they seal against pressure from within the tank, but not against back pressure from the pipe.

It is thus a further object of the invention to provide a mud valve which is capable of a bidirectional seal.

Waterman Industries, Inc, of Exeter, Calif., has attempted to improve the valve and provide a bubble-tight seal by setting a resilient O-ring into a slot in the valve seat. This has the disadvantage of O-ring wear, makes the valve more susceptible to dirt in the seal, and adds the necessity of adding an appropriately sized slot into the seat, which greatly increases the expense of manufacturing the valve.

It is thus a further object of the invention to provide a mud valve which does not use O-rings or other separate inset seal elements.

Finally, the prior art mud valves with their nonresilient seals and flat or 45 degree seats, tended to require relatively high torques to effectuate the best seal of which they were capable.

It is a further object of the invention to provide a mud valve which will effect a bubble-tight seal with relatively low torque required.

SUMMARY OF THE INVENTION

The invention solves all of the problems noted above with respect to mud valves by using a plug seat which is made of a resilient material, and which is formed to taper at an angle of approximately 28° from the vertical. The valve seat is formed with a matching 28° inclination to mate with the resilient seat. The resulting valve has excellent bubble-tight sealing capability, will seal bidirectionally against pressure from within and without the tank, and requires very low torque to effectuate the seal.

BRIEF DESCRIPTION OF THE DRAWING

FIG. 3 shows a prior art mud valve with a 45 degree seal.

FIG. 4 shows a prior art mud valve with a flat seal.

DESCRIPTION OF THE PREFERRED EMBODIMENT

Figure 1:
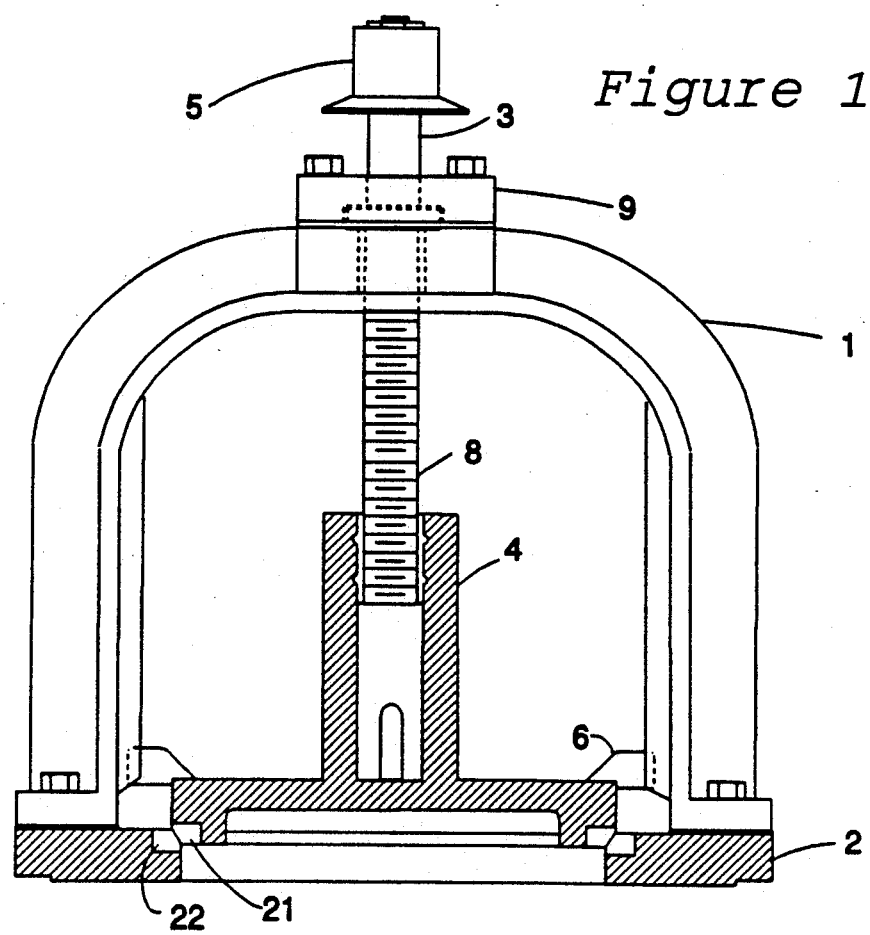
FIG. 1 shows the preferred embodiment of the invention.
Figure 2:
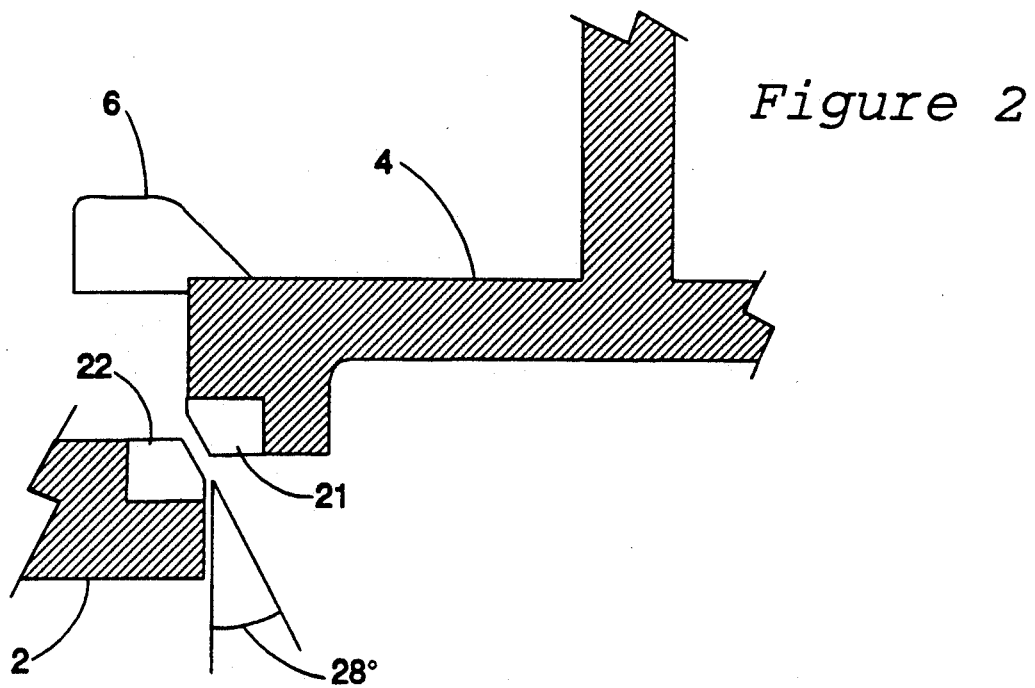
FIG. 2 shows a detail of the seal area of the invention.

The preferred embodiment of the invention is shown in FIG. 1, and is further shown in FIG. 2, which shows the details of the invention in the plug seat and valve seat area of the frame, only. The yoke and stem and the rest of the plug and frame are otherwise conventional and are shown for clarity only.

In the preferred embodiment of the invention, the plug seat portion 21 of the plug 4 is made of a resilient material, such as rubber or some synthetic equivalent such as neoprene. The resilient plug seat is roughly in the form of a right triangle, in which the plane of the outer surface (hypotenuse of the triangle) which forms the seal forms approximately a 28° angle with the plane of the inner surface of the seat. The seat may actually form a triangle or wedge (i.e. come to a point at its lower end), or it may alternately be truncated as shown in the drawings, so long as the extended planes of the two sides would meet at the approximate 28° angle required by the teachings of the invention.

The frame seat 22 is formed with a matching 28° inclination, so as to mate with the plug seat and form a bubble-tight seal. The frame seat need not be resilient, and may simply be formed into the frame as is the current practice with 45° seal mud valves. In the preferred embodiment, the frame seat is made of bronze. Alternatively, the frame seat could be formed of a resilient material within the teachings of the invention.

This approximately 28° angle has been found to provide the ideal combination of bidirectional bubble-tight seal effectiveness and low torque requirements for sealing and unsealing the valve.

In the preferred embodiment, it has been found that the plug can be formed such that a standard mechanical joint pipe gasket (or "MJ gasket") can be inset around the edge of the plug to form the 28° resilient seat. This has the advantage that MJ gaskets are commercially available in a wide variety of sizes, and are relatively inexpensive compared to custom-made seals. An example of an MJ gasket which can be incorporated into the preferred embodiment of the invention is the F-915, manufactured by Clow Corporation of Oak Brook, Ill., which is available in sizes from 6" to 30" in diameter.

The MJ gasket is normally used as a watertight packing in mechanical joint cast iron fittings, in installations where it is not possible to know the exact laying lengths of the pipe in advance. One end of a piece of pipe is inserted into a larger diameter section of pipe known as an "adjustable connecting piece". The MJ gasket is then squeezed into the gap between a tapered portion of the inner wall of the connecting piece and the outside wall of the pipe by a ring gland, forming a seal primarily on its inside straight walls. This application is completely different from the resilient valve seat in the present invention, the MJ gasket being used here purely for commercial ease of availability and economic reasons.

Accordingly, it is to be understood that the embodiments of the invention herein described are merely illustrative of the application of the principles of the invention. Reference herein to details of the illustrated embodiments are not intended to limit the scope of the claims, which themselves recite those features regarded as essential to the invention.

I claim:

1. An improved valve for mounting on a surface of a fluid-holding tank in alignment with a hole in said surface, for control of fluid flow through said hole, of the kind having a frame which has two faces, one face being sealably mounted to said tank surface and an opposing face, said frame having an opening adapted for alignment with said hole in the surface of the tank; a yoke extending perpendicular to said tank surface, affixed to the opposing face of the frame such that the center of said yoke is located over the center of said opening in the frame; the opposing face of the frame having seat means for effecting a fluid seal located around said opening; plug means for closing off the opening in the frame, located adjacent and parallel to the opposing face of the frame and centered over the opening in the frame, and mounted for vertical movement toward and away from said opposing face, whereby said opening is fully closed off when said plug is in contact with said opposing face of said frame; said plug means having seat means for effecting a fluid seal, adapted to engaging the seat means of the frame; and stem means for moving said plug means relative to said opposing face, rotatably connected to the plug means and the yoke, whereby rotation of said stem means causes the plug means to move toward or away from said opposing face, in which the improvement comprises:

a) the seat means of the plug means comprising two surfaces and a thickness between, one inner surface being attached to the plug means, the other contact surface adapted to contact the seat means of the frame the thickness tapering such that the planes of the two surfaces would meet at an angle substantially equal to 28°;

b) the seat means of the plug means being constructed of resilient material;

c) the seat means of the frame being bevelled at an angle substantially equal to 28° from the vertical, such that said seat means of the frame is adapted to sealably contact the contact surface of the seat means of the plug means.

2. The valve of claim 1 in which the resilient material of the seat means of the plug means is rubber.

3. The valve of claim 1 in which the resilient material of the seat means of the plug means is neoprene.

4. The valve of claim 1 in which the seat means of the plug means is a mechanical joint pipe gasket.

5. An improved method of constructing a valve for mounting on a surface of a fluid-holding tank in alignment with a hole in said surface, for control of fluid flow through said hole, said valve being of the kind having a frame which has two faces, one face being sealably mounted to said tank surface and an opposing face, said frame having an opening adapted for alignment with said hole in the surface of the tank; a yoke extending perpendicular to said tank surface, affixed to the opposing face of the frame such that the center of said yoke is located over the center of said opening in the frame; the opposing face of the frame having seat means for effecting a fluid seal located around said opening; plug means for closing off the opening in the frame, located adjacent and parallel to the opposing face of the frame and centered over the opening in the frame, and mounted for vertical movement toward and away from said opposing face, whereby said opening is fully closed off when said plug is in contact with said opposing face of said frame; said plug means having seat means for effecting a fluid seal, adapted to engaging the seat means of the frame; and stem means for moving said plug means relative to said opposing face, rotatably connected to the plug means and the yoke, whereby rotation of said stem means causes the plug means to move toward or away from said opposing face, in which the improvement comprises the additional steps of:
  a) constructing the seat means of the plug means of resilient material, the seat means of the plug means comprising two surfaces and a thickness between, one inner surface being attached to the plug means, the other contact surface adapted to contact the seat means of the frame;
  b) shaping the thickness of the seat means of the plug means such that the planes of the two surfaces of the seat means of the plug means would meet at an angle substantially equal to 28°;
  c) machining the seat means of the frame at an angle substantially equal to 28° from the vertical, such that said seat means of the frame is adapted to sealably contact the contact surface of the seat means of the plug means.

6. The method of claim 5 in which the resilient seat means of the plug means is a mechanical joint pipe gasket.

7. In a valve of the kind having a frame for mounting on a surface of a fluid-containing tank, the frame having a circular opening for the passage of fluid, and circular plug means for closing the opening in the frame, the use of a mechanical joint pipe gasket having a taper substantially equal to 28° from the vertical as a resilient seal between the plug means and a portion of the frame adjacent the opening which frame portion is formed with a matching taper of substantially equal to 28° from the vertical.

* * * * *